(12) United States Patent
Brzezinski et al.

(10) Patent No.: US 8,918,244 B2
(45) Date of Patent: Dec. 23, 2014

(54) SYSTEM AND METHOD OF SYNCHRONIZING AN IN-VEHICLE CONTROL SYSTEM WITH A REMOTE SOURCE

(75) Inventors: Daniel Brzezinski, Hudsonville, MI (US); Michael S. Bahamonde, Weston, FL (US); Todd R. Witkowski, Zeeland, MI (US); Michael A. Supanich, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 1123 days.

(21) Appl. No.: 12/514,446

(22) PCT Filed: Nov. 13, 2007

(86) PCT No.: PCT/US2007/084570
§ 371 (c)(1),
(2), (4) Date: Nov. 4, 2009

(87) PCT Pub. No.: WO2008/061098
PCT Pub. Date: May 22, 2008

(65) Prior Publication Data
US 2010/0063670 A1    Mar. 11, 2010

Related U.S. Application Data

(60) Provisional application No. 60/858,975, filed on Nov. 14, 2006.

(51) Int. Cl.
| | | |
|---|---|---|
| G06F 19/00 | (2011.01) |
| H04L 29/08 | (2006.01) |
| H04N 21/41 | (2011.01) |
| H04N 21/414 | (2011.01) |
| G06F 21/35 | (2013.01) |
| G06F 17/30 | (2006.01) |

(52) U.S. Cl.
CPC ............ H04L 67/1095 (2013.01); *G06F 21/35* (2013.01); *G06F 17/30174* (2013.01); H04N 21/4126 (2013.01); *H04L 67/12* (2013.01); H04N 21/414 (2013.01); H04N 21/4131 (2013.01); *G06F 17/30575* (2013.01)
USPC ......................................... 701/31.4; 701/537

(58) Field of Classification Search
CPC .............. G06F 13/00; G06F 17/30174; G06F 17/30176; G06F 17/30575; G06F 17/30578; G06F 21/35; H04L 29/06; H04L 29/06027; H04L 67/10; H04L 67/1095; H04L 67/12; H04L 67/125; H04L 67/18; H04L 69/329; H04N 21/4126; H04N 21/4131; H04N 21/414; Y10S 707/9994
USPC ......................................... 701/537; 709/248
See application file for complete search history.

(56) References Cited

U.S. PATENT DOCUMENTS 5,479,155 A * 12/1995 Zeinstra et al. ............... 340/5.25
6,526,335 B1 * 2/2003 Treyz et al. ....................... 701/1
(Continued)

OTHER PUBLICATIONS

International Search Report and Written Opinion for International Application No. PCT/US2007/084570 mailing date Mar. 26, 2008; 10 pages.

(Continued)

*Primary Examiner* — Jerrah Edwards
(74) *Attorney, Agent, or Firm* — Foley & Lardner LLP

(57) ABSTRACT

The present application relates to an in-vehicle control system for synchronizing files with a remote source. The remote source includes a storage device configured to store a first file. The system includes a communications device capable of establishing a wireless communication link with the remote source. The communications device is configured to send, receive, or both send and receive files to and/or from the remote source. The system further includes a memory device configured to store a second file. The system yet further includes a data processing device coupled to the communications device, the data processing device configured to perform a comparison of the first file of the remote source and the second file of the memory device, wherein the data processing device is further configured to synchronize the file of the remote source and the file of the in-vehicle control system based on the comparison.

11 Claims, 9 Drawing Sheets

(56) References Cited

U.S. PATENT DOCUMENTS

| | | |
|---|---|---|
| 7,885,926 B2* | 2/2011 | Grace et al. .................. 707/624 |
| 2005/0197747 A1* | 9/2005 | Rappaport et al. ................ 701/1 |
| 2006/0004788 A1 | 1/2006 | Pilgrim et al. |
| 2007/0279186 A1* | 12/2007 | Skekloff et al. ............. 340/5.61 |

OTHER PUBLICATIONS

Stirling, Andrew; "Mobile Multimedia Platforms", Vehicular Technology Conference, IEEE, vol. 6, Sep. 24, 2000; pp. 2541-2548.

Burkhardt, J. et al., "Pervasive Computing; Technology and Architecture of Mobile Internet Applications", Jan. 15, 2002; pp. 98-101.

Brinkschulte, Carsten et al., "SyncML Client Server", Technical Specification for the weblicon SyncML Server and SyncML Clients; Version: 1.8; Jan. 10, 2003; 30 pages.

Nelson, E.C. et al., "An embedded architectural framework for interaction between automobiles and consumer devices", Real-Time and Embedded Technology and Applications Symposium, $10^{th}$ IEEE, Toronto, Canada, May 25-28, 2004; pp. 192-199.

Ghandeharizadeh, Shahrom et al., "An Evaluation of Location-Demographic Replacement Policies for Zebroids", Consumer Communications and Networking Conference, $3^{rd}$ IEEE, Las Vegas, NV; Jan. 8-10, 2006; pp. 238-242.

* cited by examiner

SYSTEM AND METHOD OF SYNCHRONIZING AN IN-VEHICLE CONTROL SYSTEM WITH A REMOTE SOURCE

CROSS-REFERENCE TO RELATED PATENT APPLICATIONS

The present application claims the benefit of International Application No. PCT/US2007/084570 filed Nov. 13, 2007, which claims the benefit of U.S. Provisional Patent Application No. 60/858,975 filed Nov. 14, 2006, the entire disclosures of which are incorporated by reference herein. The present application also incorporates the entirety of U.S. Pat. No. 7,257,426 by reference.

BACKGROUND

The present application relates generally to the field of synchronization between an in-vehicle control system and a remote source. The application relates more specifically to systems and methods for wireless data synchronization between an in-vehicle control system and a personal computer.

Vehicles typically include a number of electronics systems and subsystems such as an audio system, a mobile telephone system, a navigation system, an in-vehicle entertainment system, an engine management system that may be controlled by a user interface, an HVAC system, etc. One or more of these systems may include an in-vehicle control system having media capabilities that may be setup in the vehicle for a user to access digital audio or video content via the control system. The control system may include a control interface and accompanying controls and may be configured to be coupled or integrated with other vehicle electronic systems, such as an audio or video system.

The media for the system may include conventional media sources (e.g., CDs, DVDs, etc.), but recently may also include media files from the Internet and media files stored on other data storage devices (i.e., flash memory, hard drives, etc.). Typical vehicle audio systems may include conventional stereo inputs for external media players, slots for flash memory devices, and adapters for specific media players. Users of digital media files typically store their library of digital media files primarily on a home or personal computer. Thus, to access or play media files via an in-vehicle audio system the user conventionally must use one of the aforementioned physical devices to transport media files from a home computer to a vehicle. The user must normally take multiple steps to ensure his vehicle audio system is adapted for use and compatible with the physically transported media device. For example, if a user owns a media player and wishes to play the media files stored within the media player on a car stereo, the user must purchase and install an aftermarket player-to-vehicle adapter; if the user would like to listen for an extended period of time, the user may also need to install a power adapter. In addition to the cost, these adapters are often device-specific. Thus, if the user changes media players at some point, his installed adapters may not be compatible with his new player.

In addition to transferring media files, it is becoming more desirable to store files of many different types on in-vehicle control systems. For example, it may be desirable to store navigational information, weather information, satellite radio information, setup installation, vehicle setup related information, contact information, calendar information, e-mail information, browser information, and any other type of information on an in-vehicle control system. There are currently few ways of transferring this type of information to vehicles. For example, typical vehicles load navigational information into the car navigational system by reading a set of CDROMs or DVDs.

There is a need for a system for synchronizing the data store of a vehicle with a remote source. It is challenging and difficult to provide advanced media and communications systems in vehicles. It is challenging and difficult for engineers of vehicle systems to provide systems that are robust, capable of mass-production, easy-to-use, and technically sound. Changing one aspect of a vehicle media system and/or vehicle communication system might negatively impact other aspects or systems.

It would be desirable to provide a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to an in-vehicle control system for synchronizing files with a remote source. The remote source includes a storage device configured to store a first file. The system includes a communications device capable of establishing a wireless communication link with the remote source. The communications device is configured to send, receive, or both send and receive files to and/or from the remote source. The system further includes a memory device configured to store a second file. The system yet further includes a data processing device coupled to the communications device, the data processing device configured to perform a comparison of the first file of the remote source and the second file of the memory device, wherein the data processing device is further configured to synchronize the file of the remote source and the file of the in-vehicle control system based on the comparison.

Another embodiment relates to a method for synchronizing the data files of an in-vehicle control system with a remote source and includes receiving a synchronization command from a wireless portable device, wherein the synchronization command is received by a signal receiver, activating the in-vehicle control system from a powered-down state to a powered-up state, establishing a data communications link between the in-vehicle control system and the remote source, and synchronizing at least one data file between the in-vehicle control system and the remote source via the data communication link.

Another embodiment relates to a method for synchronizing the data files of a remote source with an in-vehicle control system and includes receiving a synchronization command to an in-vehicle control system via an in-vehicle input device coupled to the in-vehicle control system, establishing a data communication link between a remote source and the in-vehicle control system, and synchronizing a plurality of data files stored in the remote source with a plurality of data files stored in the in-vehicle control system.

The invention is capable of other embodiments and of being practiced or being carried out in various ways. Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings.

DETAILED DESCRIPTION OF THE EXEMPLARY EMBODIMENTS

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Referring generally to the FIGS., an in-vehicle control system is provided. The in-vehicle control system includes a processor and is communicably coupled to memory. The in-vehicle control system is configured to synchronize the files of a local device via wireless communication with a remote source. The in-vehicle control system provides at least one method for activating or initiating the synchronization. According to an exemplary embodiment, the synchronization is activated via a key fob.

Figure 1:
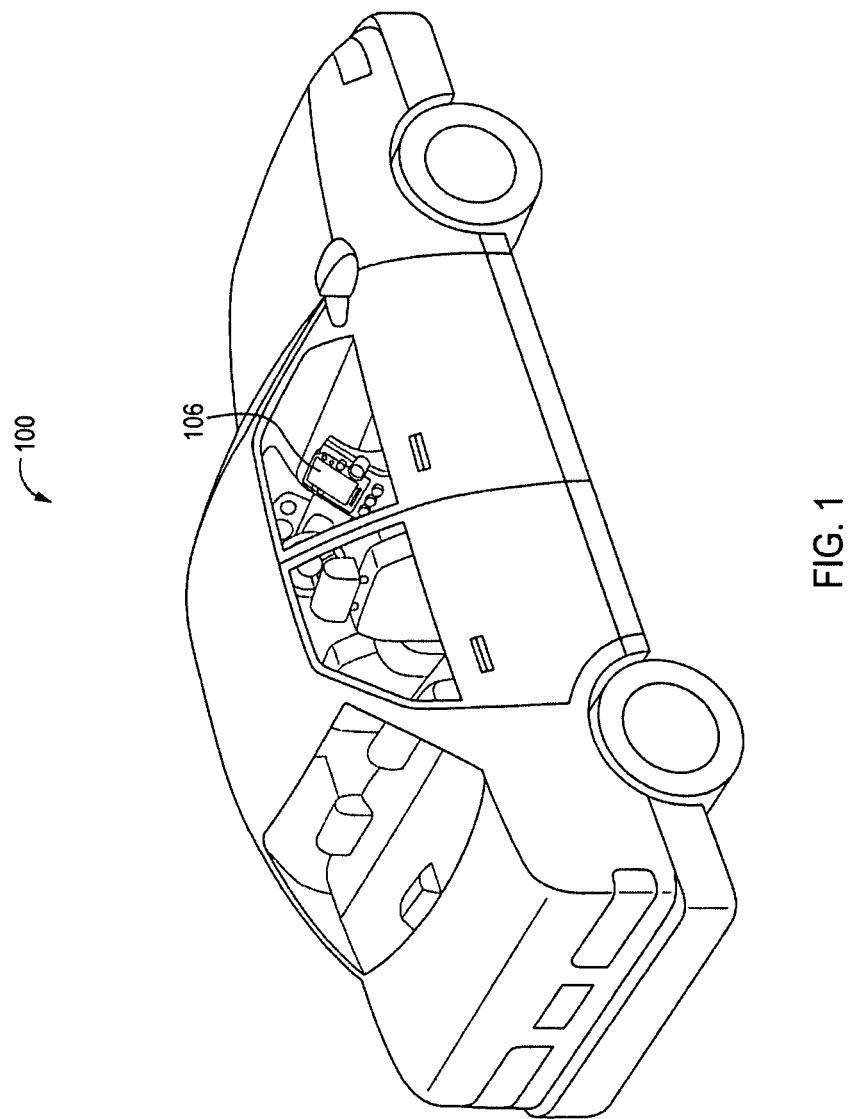
FIG. 1 is a perspective view of a motor vehicle that includes a number of vehicle systems, including an in-vehicle control system according to one exemplary embodiment.

Referring to FIG. 1, a vehicle 100 includes a number of subsystems for user convenience and entertainment. Vehicle 100 generally includes a heating, ventilation, and air-conditioning (HVAC) system, a sound system, and an in-vehicle control system 106 (e.g., media system, navigational system, entertainment system, etc.). The HVAC system and sound system may be coupled to in-vehicle control system 106, which is capable of controlling and monitoring both systems, automatically or by a manual user command. It is noted that in various exemplary embodiments, vehicle 100, the HVAC system, the sound system, and other vehicle systems may be of any past, present, or future design capable of interacting with in-vehicle control system 106. In-vehicle control system 106 is shown fixably mounted to a center console of a vehicle, but various components of in-vehicle control system 106 could also be mounted to other locations (e.g., the steering wheel, a visor, driver information console, etc.).

Figure 2:
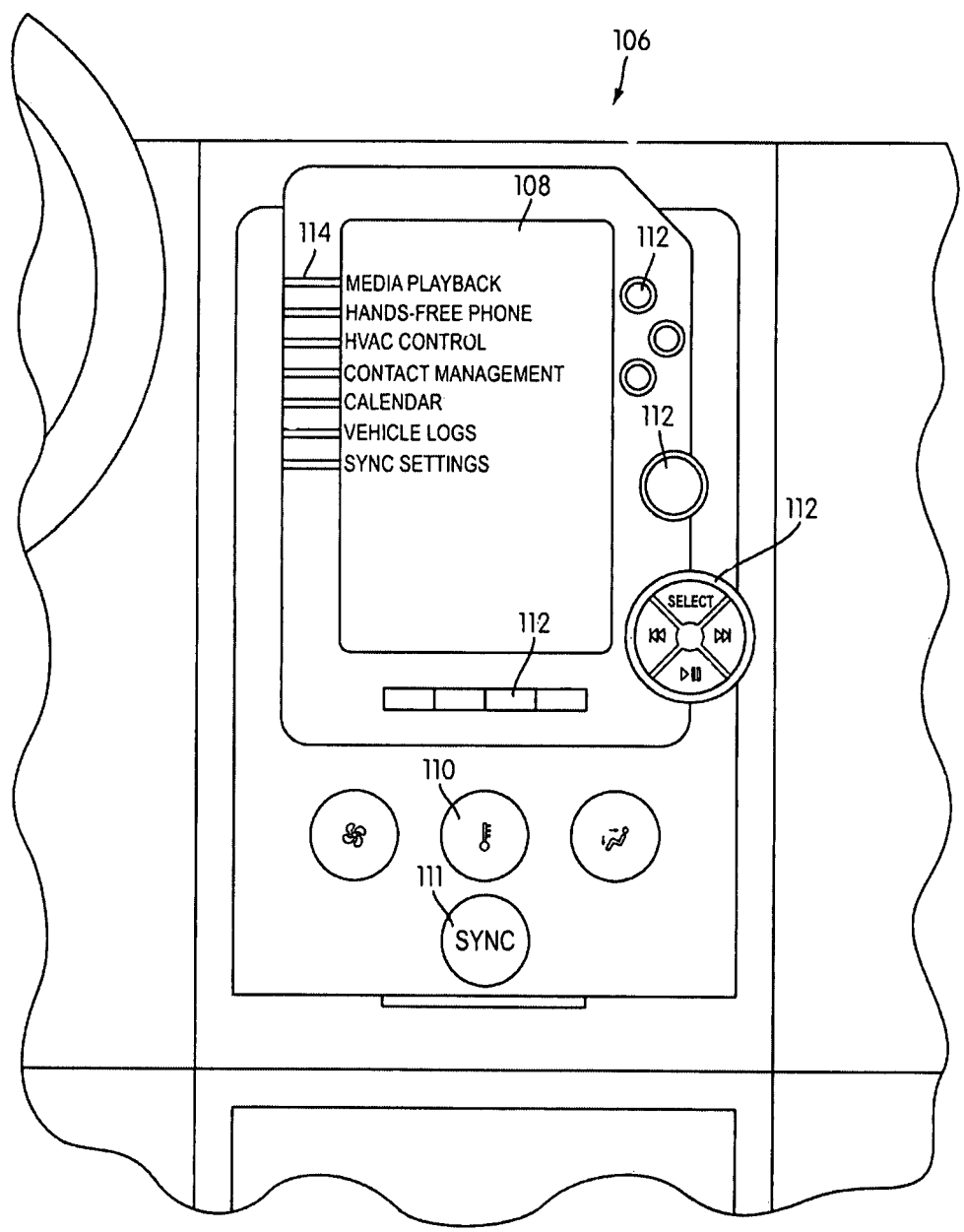
FIG. 2 is a front elevation view of the user interface of the in-vehicle control system of FIG. 1 according to an exemplary embodiment.

Referring to FIG. 2, one exemplary embodiment of in-vehicle control system 106 is shown. In-vehicle control system 106 generally includes an output display 108, one or more knobs 110, one or more pushbuttons 111, 112, and one or more tactile user inputs or pushbuttons 114, which facilitate controlling various vehicle and media functions. In one exemplary embodiment, output display 108 may be a touch-screen display, while in other exemplary embodiments, may be any other non-touch sensitive display. In still other exemplary embodiments, output display 108 may be of any technology (e.g., LCD, DLP, plasma, CRT, OLED, LED, LEP, OEL), configuration (e.g., portrait or landscape), or shape (e.g., polygonal, curved, curvilinear). Knobs 110 and pushbuttons 112 and 114 may be configured: (i) to control functions of the HVAC system such as fan speed, cabin temperature, or routing of air flow, (ii) to control playback of media files over the sound system, (iii) to control retrieval of phonebook entries, or (iv) to control any other desired vehicle function. Pushbuttons 114 typically allow for the selection and display of various functions of in-vehicle control and media system 106 including HVAC system control, sound system control, media system control, hands-free phone use, contract or address/phone book management, calendar viewing/modification, and vehicle data logging. The operation of pushbutton 114 for media playback may display a media playback menu screen or execute commands that allow the user to view, select, sort, search for, and/or play audio or video files by tactile or oral command. The operation of pushbutton 114 for hands-free phone operation may display a menu screen or execute commands that allow the user to connect in-vehicle control system 106 to a mobile phone so that speaking into the vehicle console of in-vehicle control system 106 operates the mobile phone. The operation of pushbutton 114 for HVAC control may display a menu screen or execute commands that allow the user to control cabin temperature and air flow by tactile or oral command. The operation of pushbutton 114 for contact management may display a menu screen or execute commands that allow the user to view, list, select, sort, search for, edit, and/or dial one or more entries containing personal contact information, by use of a tactile or oral command. The operation of pushbutton 114 for calendar management may display a menu screen or execute commands that allow the user to view, list, select, sort, search for, edit, and/or create one or more entries containing personal schedule information by tactile or oral command. The operation of pushbutton 114 for vehicle log management may display a menu screen or execute commands that allow the user to input, view, select and/or reset information related to the vehicle operation (e.g., fuel economy, engine temperature, distance to empty, etc.) by tactile or oral command.

Figure 3:
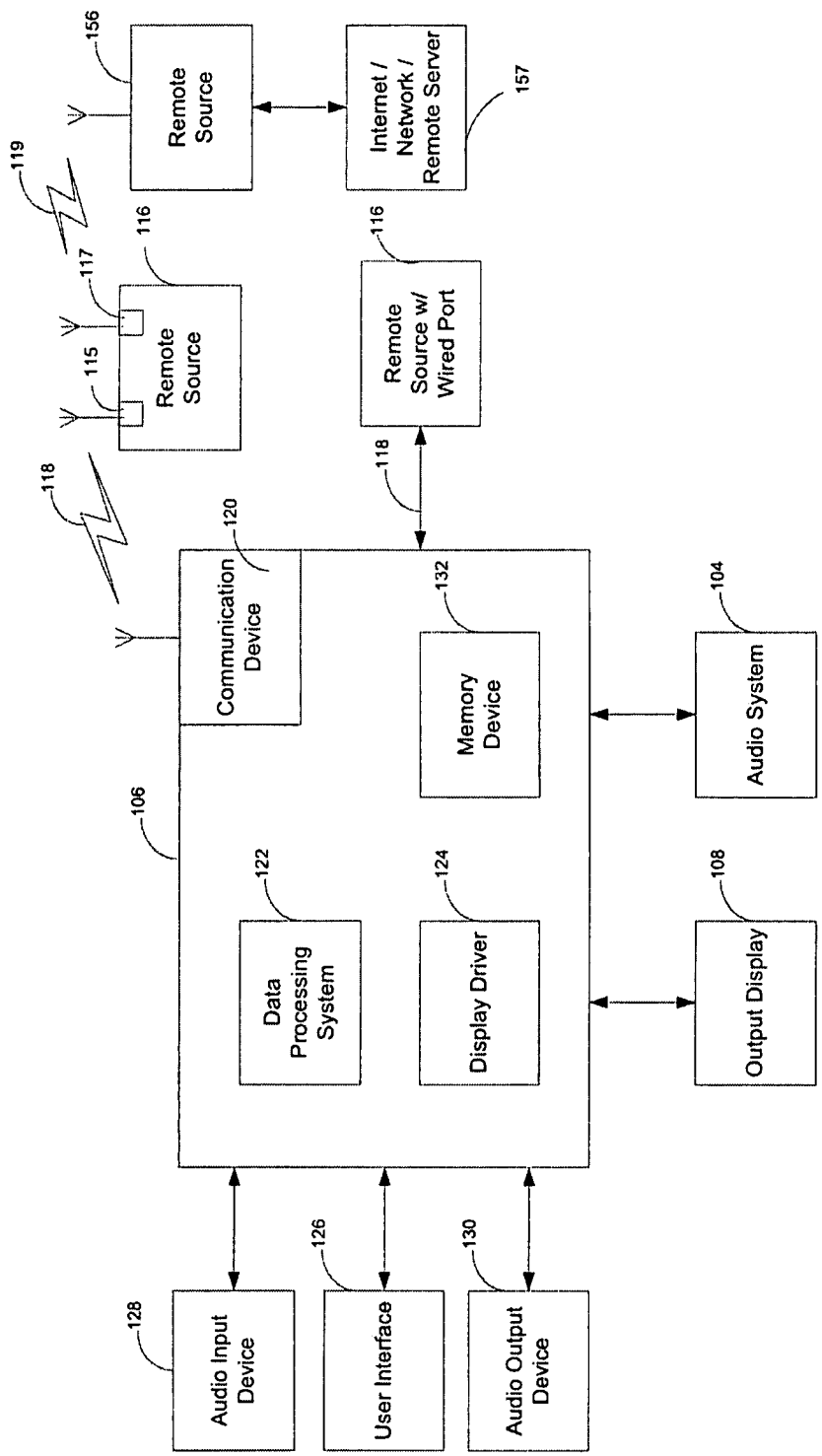
FIG. 3 is a block diagram of the in-vehicle control system of FIG. 1.

Referring to FIG. 3, in-vehicle control system 106 is capable of accessing data files from a remote source 116 and/or remote source 156 over a communication link 118. For example, in-vehicle control and media system 106 may access media files, phonebook data files, phone annunciators, configuration data, e-mail data, text message data, voice mail data, text data, music information, map information, direction information, point of interest information, menu information, calendar data, or any other accessible data for use by in-vehicle control and media system.

In-vehicle control system 106 generally includes a communication device 120, a data processing system 122, a display driver 124, a user interface 126, an audio input device 128, an audio output device 130, and a memory device 132.

Communication device 120 is generally configured to establish communication link 118 with remote source 116. In one exemplary embodiment, in-vehicle control and media system 106 may establish a wireless communication link such as with Bluetooth communications protocol, an IEEE 802.11 protocol, an IEEE 802.16 protocol, a cellular signal, a Shared Wireless Access Protocol-Cord Access (SWAP-CA) protocol, a wireless USB protocol, a WiFi-compatible protocol, a WiMax-compatible protocol, mobile WiMax, a ZigBee-compatible protocol, or any other suitable wireless technology. In another exemplary embodiment, in-vehicle control and media system 106 may establish a wired communication link such as with USB technology, IEEE 1394 technology, optical technology, other serial or parallel port technology, or any other suitable wired link. Communication device 120 may receive one or more data files from remote source 116 and/or 156. In various exemplary embodiments, the data files may include text, numeric data, audio, video, or any combination thereof. Communication device 120 may also transmit information and/or data files to one or more remote sources such as remote source 116 and/or remote source 156.

Communication device 120 is shown to include (or be communicably coupled to) an antenna. Communication device 120 may establish a wireless communication link (or otherwise wirelessly communicate) with transceiver 115 of remote source 116. In situations where remote source 116 includes two transceivers (or a single receiver capable of near-simultaneous communication with multiple devices), remote source 116 may forward requests, information, and/or data between communication device 120 and another remote source 156. For example, communication device 120 may establish a Bluetooth-compatible wireless communication link with transceiver 115 of remote source 116. Communication device 120 may send a command to transceiver 115 so that remote source 116 establishes a second wireless communication link 119 (e.g., a cellular communication link) with remote source 156 via transceiver 117. When used in this manner, communication device 120 may communicate (e.g., send and receive files to/from) with remote source 156. Remote source 156 may be coupled to other communication networks (the Internet, LANs, WANs, remote servers) 157 and/or otherwise coupled to other servers or data stores. For example, remote source 116 could be a mobile phone and remote source 156 could be a wireless service organization in communication with the Internet, another network, and/or a remote server 157. Communication device 120 may receive files from these sources (e.g., 116, 156, 157) after sending remote source 116 appropriate commands, requests, or otherwise.

Data processing system 122 is coupled to communications device 120 and is generally configured to control each function of in-vehicle control and media system 106. Data processing system 122 preferably facilitates speech recognition capabilities of in-vehicle control system 106 for the convenience of the user. Data processing system 122 may include digital or analog processing components or be of any past, present, or future design that facilitates control of in-vehicle control system 106. Data processing system 122 may include or be coupled to any number of processors configured to execute or facilitate the execution of the processes described herein. Data processing system 122 may be communicably coupled to memory (e.g., memory device 132) and configured to access and/or execute computer code stored in the memory and relating to the processes described herein (or otherwise).

Display driver 124 is coupled to output display 108 (or another display mounted in the vehicle) and is typically configured to provide an electronic signal to the output display (or the another display). In one exemplary embodiment, the electronic signal may include the text and/or numeric data of the data files, while in other exemplary embodiments, any other desired data may be included with the text and/or numeric data or by itself in the electronic signal to the output display. The display driver and the electronic signal may operate according to any suitable digital and/or analog output technology. In another exemplary embodiment, display driver 124 may be configured to control output display 108 with touch-screen capabilities, while in other exemplary embodiments, display driver 124 may be configured to control display 108 without making use of touch-screen capabilities. In still other exemplary embodiments, display driver 124 may be of any past, present, or future design that allows for the control of output display 108.

Audio input device 128, for example a microphone, is configured to receive the utterance of a user for transmission to data processing system 122 for speech recognition so that the functions of in-vehicle control system 106 may be operated by voice command. Audio output device 130, for example a built-in speaker, is configured to provide the user with an audio prompt of various functions, such as user selection confirmation.

Memory device 132 is configured to store data accessed by in-vehicle control system 106. For example, memory device 132 may store data received from remote source 116, data created by data processing system 122 that may be used later, intermediate data of use in a calculation, or any other data used by in-vehicle control system 106. Memory device 132 may include any number of memory devices on control system 106. Memory device 132 may also include computer code for executing one or more process described herein (for execution by data processing system 122 or another processor of the system). Memory device 132 is communicably coupled to data processing system 122. Memory device 132 may also be configured to store settings or configuration data relating to one or more vehicle control systems or processes. For example, memory device 132 may be configured to store synchronization settings. The synchronization setting may be set via the user interface (e.g., via option "Sync Settings" shown in FIG. 2, etc.), voice command, or otherwise. The control system may read the synchronization settings from memory and execute various synchronization steps according to the synchronization settings. This way, if file synchronization is triggered remotely or when the user does not want to manually configure the synchronization process, the synchronization process may complete in a manner desirable to the user.

Figure 4:
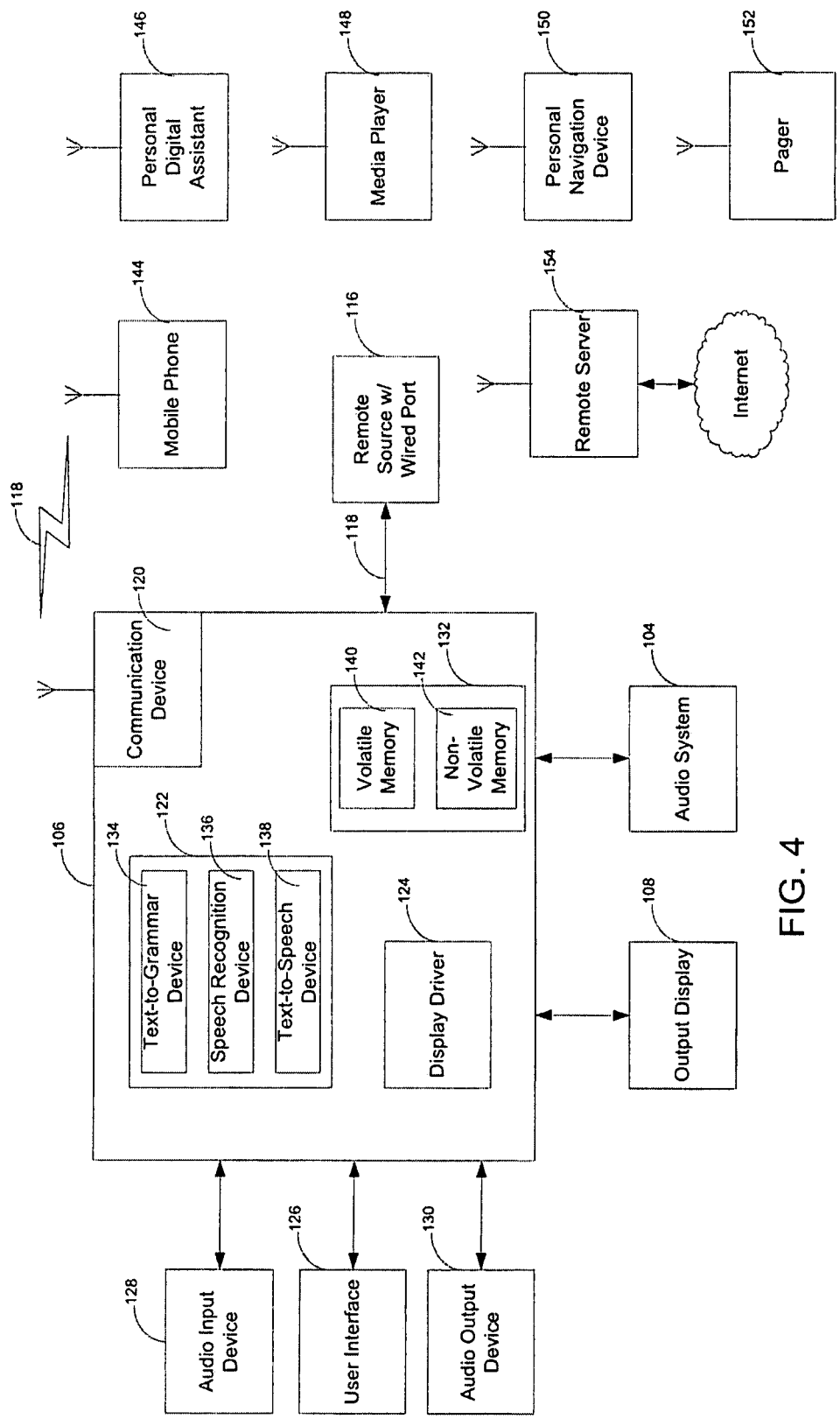
FIG. 4 is a more detailed embodiment and block diagram of the in-vehicle control system of FIG. 3 according to one exemplary embodiment.

Referring to FIG. 4, in-vehicle control system 106 and remote source 116 are shown in greater detail. Data processing system 122 generally includes a text-to-grammar device 134, a speech recognition device 136, and a text-to-speech device 138.

Text-to-grammar device 134 may be coupled to communications device 120 and is generally configured to generate a phonemic representation of the text and/or numeric data of each of the data files received by communications device 120 from remote source 116. The phonetic representation of the text and/or numeric data of each data file may be configured to facilitate speech recognition of each data file. After conversion of a data file to a phonetic representation, the data file may be accessed via an oral input command received by speech recognition device 136 via audio input device 128.

Speech recognition device 136 is typically configured to receive an oral input command from a user via audio input device 128. Speech recognition device compares the received oral input command to a set of predetermined input commands, which may have been configured by text-to-grammar device 134 or otherwise. In various exemplary embodiments, the input commands may be related to the playback of a media file, the dialing or input of a phone book entry, the entry or listing of calendar or contact data, the control of the HVAC system, or any other desired function to be performed on data. Speech recognition device 136 may determine an appropriate response to the oral input command received from the user, for example, whether the oral input command is a valid or invalid instruction, what command to execute, or any other appropriate response. Speech recognition device 136 (and/or the predetermined set of input commands) may be configured to recognize commands relating to the initialization or activation of synchronization activities. Speech recognition device 136 (and/or the predetermined set of input commands) may also be configured Text-to-speech device 138 is generally configured to convert the text and/or numeric data of each data file received from remote source 116 into an audible speech representation. This functionality may allow in-vehicle control system 106 to audibly give data to the user via audio output device 130 or the audio system 104. For example, in-vehicle control system 106 may repeat a user selected function back to the user, announce media file information, provide phonebook or contact information, or other information related to data stored in memory 132, remote source 116, remote server 154, etc.

Memory device 132 includes both a volatile memory 140 and a non-volatile memory 142. Volatile memory 140 may be configured so that the contents stored therein may be erased during each power cycle of the control system 106 or the vehicle 100. Non-volatile memory 142 may be configured so that the contents stored therein may be retained across power cycles, such that upon control system 106 power-up, data from previous system use remains available for the user.

According to an exemplary embodiment, remote source 116 and/or 156 may be any suitable remote source that includes a transceiver and is able to interface with in-vehicle control system 106 over communications link 118 (either wireless or wired). In various exemplary embodiments, remote source 116 may be one or more of a mobile phone 144, a personal digital assistant (PDA) 146, a media player 148, a personal navigation device (PND) 150, a remote server 154 that may be coupled to the Internet, a computer, a personal computer, a networked storage drive, or various other remote sources. Remote source 116 may have a memory or data storage device, one or more processing devices, and one or more communications devices.

Referring still to FIG. 4, in-vehicle control system 106 may include interfaces to other systems. For example, in-vehicle control system 106 is shown to include interfaces to an audio input device (e.g., microphone) 128, user interface 126, audio output device 130, output display 108, and audio system 104. In-vehicle control system 106 may provide audio output to either audio output device 130 or audio system 104. According to an exemplary embodiment, audio system 104 is the primary audio system of the vehicle. The interfaces included on in-vehicle communications system 106 may be configured to operate according to an analog format, a digital format, and/or any combination thereof. The interfaces may include any number of physical jacks or terminals for physically coupling the in-vehicle control system to the other vehicle systems (e.g., output display 108, audio system 104, audio input device 128, etc.).

Figure 5:
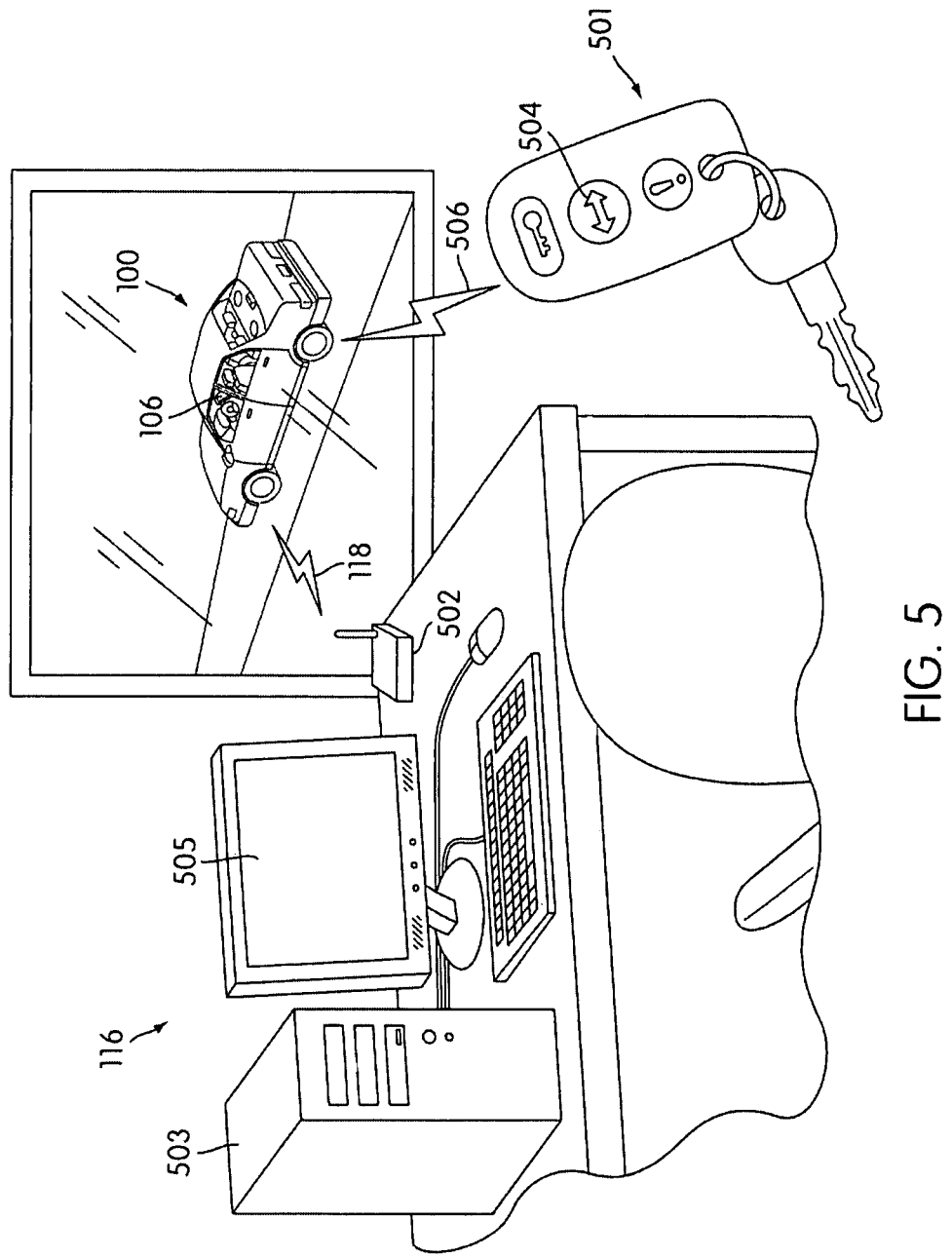
FIG. 5 is a perspective view of the in-vehicle control system communicating with a remote source and a key fob, according to an exemplary embodiment.

Referring to FIG. 5, according to an exemplary embodiment, vehicle 100 and control system 106 are shown in wireless communication with home computer or remote source 116. Remote source 116 is shown having a computer tower ("CPU") 503, a display 505, and a wireless communication device 502. According to an exemplary embodiment, generally, when a user would like to synchronize files residing in control system 106 and remote source 116, the user may press a synchronization button 504 on a portable wireless device 501. Portable wireless device 501 will send a synchronization command from the portable wireless device 501 to the vehicle 100 and control system 106. Processes within control system 106 may then initiate wireless communication link 118 with remote source 116 (e.g., home personal computer, etc.) and begin a synchronization process.

Referring further to FIG. 5, according to an exemplary embodiment, the wireless synchronization system using a portable wireless device 501 to activate communication advantageously allows a user to synchronize while vehicle 100 is parked, unattended, and turned off. As long as portable wireless device 501 is within the range of the vehicle 100, the user may initiate synchronization with the remote server 154. Portable wireless device 501 may include a synchronization button 504 and one or more buttons that may function to provide a normal vehicle function (e.g., activate vehicle alarm, lock/unlock the doors, open the trunk, start the vehicle, etc.). According to various alternative embodiments, the synchronization activating functionality of portable wireless device 501 may be incorporated into any number different of types of portable wireless devices 501 (e.g., personal digital assistants, global positioning devices, personal media players, wallets, umbrella handles, cellular telephones, home control devices, etc.). According to various other alternative embodiments, portable wireless device 501 may attach or be included with remote source 116 (e.g., may be a USB dongle, IEEE 1394 device, other serial or parallel communicating device, a device integrated onto the motherboard of the CPU 503, etc.). According to an exemplary embodiment, portable wireless device 501 may be any portable wireless device 501 of past, present or future design capable of wirelessly communicating with vehicle 100 to activate wireless synchronization between control system 106 and remote source 116.

Referring further to FIG. 5, according to an exemplary embodiment, portable wireless device 501 may be configured to activate a powering function (e.g., booting function, initiating function, "waking" function, powering-up function, etc.) of control system 106. For example, vehicle 100 and control system 106 may be turned off (e.g., powered down, "hibernating," "sleeping," powering down, etc.) and parked outside the user's home (e.g., in the user's garage, on the street, or otherwise). When a user would like to synchronize, and after he presses synchronization button 504, a communications signal 506 sent from the portable wireless device 501 to the vehicle 100 may cause control system 106 to activate (e.g., power-up, "wake," "boot," "initiate," etc.). According to various exemplary embodiments, control system 106 may experience a range of power-up or activation levels. For example, signal 506 may trigger a fully powered-up state of control system 106, a "minimally powered-up" state wherein only the components of vehicle 100 and control system 106 necessary to effect the synchronization are powered, and/or any other powered-up level.

Referring further to FIG. 5, according to an exemplary embodiment, synchronization may also be initiated via remote source 116, vehicle 100, or in-vehicle control system 106. For example, wireless communication device 502 may send a "wake" and/or synchronize signal via communication link 118 to control system 106. Wireless communication device 502 may exist as a device internal or external to remote source 116. Wireless communication device 502 may be a full-time network device (e.g., network node module, wireless card, etc.), a full-function network device (e.g., router, gateway, relay, hub, etc.), a reduced function network device (e.g., end node, etc.), or any other type of communications device or network device. Wireless communication device 502 may be a communication device configured to provide any number or any type of wireless communications compatible with at least one communication device of control system 106. For example, wireless communication device 502 may be a WiFi device (802.xx, etc.), a low-powered wireless device (e.g., Bluetooth, ZigBee, low-powered RF, etc.), a high powered RF device, a cellular device, a satellite device, or any wireless device of the past, present or future that is capable of transmitting and/or receiving wireless data communications. It is important to note that wireless communication device 502 need not be physically coupled to remote source 116. For example, wireless communication device 502 may be a wireless hotspot that may communicate with remote source 116 via an Internet connection, LAN, WAN, or any other network.

Referring further to FIG. 5, according to an exemplary embodiment, remote source 116 is a personal computer. However, remote source 116 may be any device having files capable of synchronization (e.g., transfer to/from) with control system 106. According to various exemplary embodiments, remote source 116 may be a remote sever 154. According to other various embodiments, remote source 116 may be a commercial data server, a PDA, a mobile phone, a PND, a pager, a media player, a remote source with a wired port, a remote server, another vehicle, etc. Additionally, while remote source 116 is shown as having a personal computer tower or CPU and a display 505, remote source 116 may not have a display or the display may be integrated with the housing of the personal computer.

Referring further to FIG. 5, according to an exemplary embodiment, the wireless signal 506 sent from wireless portable device 501 may be a radio frequency signal. For example, wireless signal 506 may be a low-powered radio frequency signal sent from a key fob. Wireless signal 506 may be of roughly the same frequency and/or of roughly the same format as the primary vehicle key function. When implemented in this manner, the key fob may advantageously use the same transmitter (or transceiver) to activate synchronization that is used to provide the primary vehicle function (e.g., unlock/lock, etc.). According to various exemplary embodiments, the wireless signal 506 may be of any electromagnetic radio frequency, frequencies, format, or technology capable of being used as a wireless data communication frequency (e.g., frequencies from 3 hz-300 ghz, etc.). For example, wireless signal 506 may be an optical communications signal (e.g., infrared, etc.).

Figure 6:
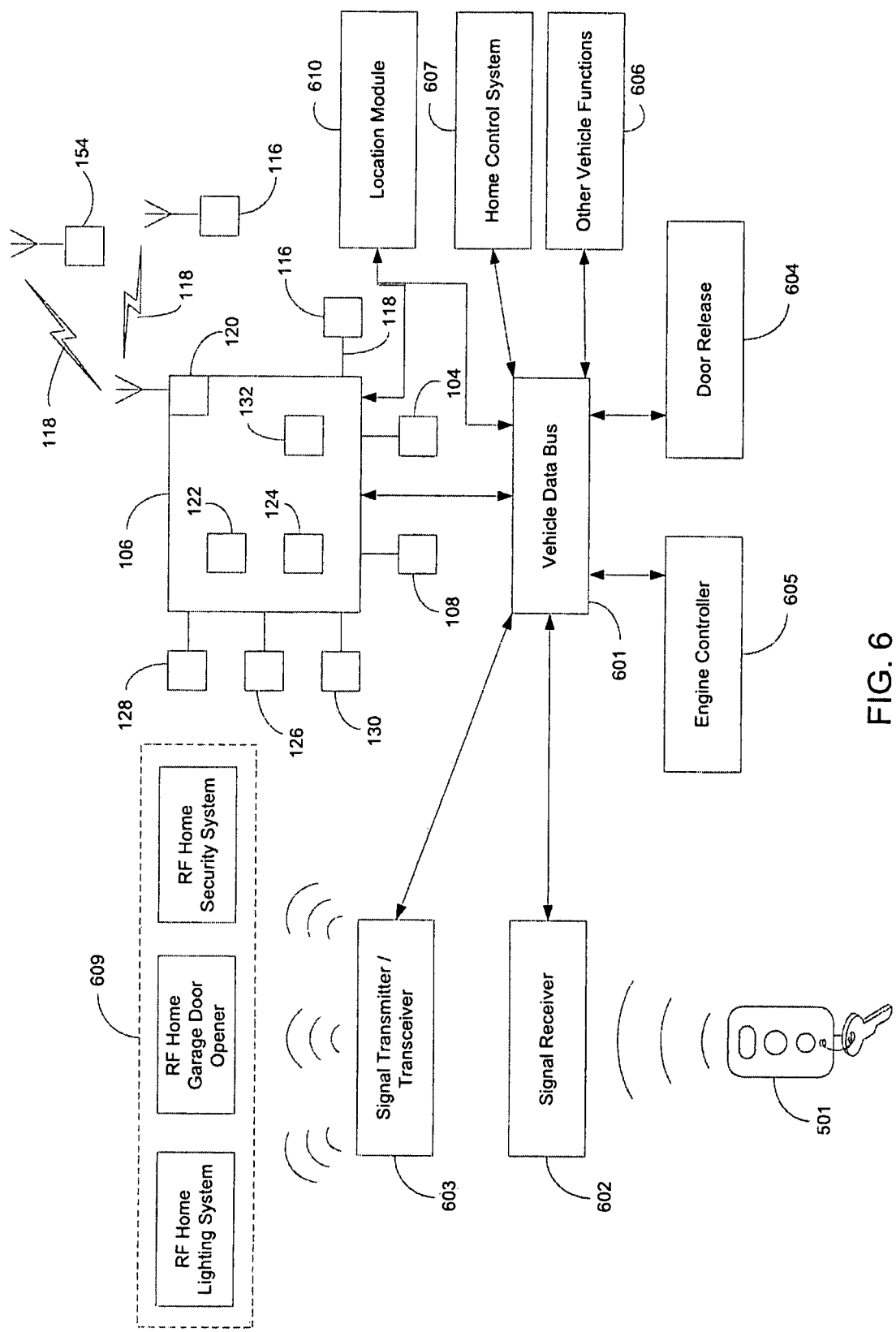
FIG. 6 is a block diagram of the in-vehicle control system of FIGS. 3 and 4 connected to the vehicle data bus and other vehicle systems, according to an exemplary embodiment.

Referring to FIG. 6, according to an exemplary embodiment, control system 106 of FIGS. 1-6 is shown in communication with a vehicle data bus 601 and a variety of other vehicle subsystems. According to an exemplary embodiment, vehicle data bus 601 is the primary vehicle data bus and is communicably coupled to many of the functional subsystems of the vehicle 100. For example, vehicle data bus 601 may be coupled in communication with an engine controller 605 (ECU), a door release 604, a signal receiver 602, a signal transmitter 603, a home control system 607, and/or another vehicle subsystem or function 606 (e.g., alarm system, etc.).

Wireless portable device 501 is shown transmitting to signal receiver 602. Signal receiver 602 is coupled to vehicle data bus 601. This configuration may allow control system 106 to power-down while signal receiver 602 stays powered and in a signal receiving mode of operation. When signal receiver 602 receives a synchronization signal, signal receiver 602 may route or relay that signal to the vehicle data bus 601. Vehicle data bus 601 and/or components located on control system 106 may then be configured to wake control system 106 for synchronization. The same signal receiver 602 may be configured to receive signals relating to primary vehicle functions that may use the vehicle data bus 601. For example, wireless portable device 501 may transmit a door release signal to signal receiver 602 that is routed via the vehicle data bus 601 to a door release component 604. According to other exemplary embodiments, signal transmitter/transceiver 603 and/or signal receiver 602 are directly coupled to and/or integrated with control system 106.

According to an exemplary embodiment, vehicle data bus 601 is an electronic communications network that interconnects components inside the vehicle. Vehicle data bus 601 may be connected to devices such as an engine control module, a timing control module, an anti-lock braking system, a diagnostics system, a wheel speed sensor, any number of other sensors, and/or various other body control modules. The modules and systems coupled to the vehicle data bus may further receive input from a variety of sensors or feedback enabled actuators. Data exchange may frequently occur between vehicle components during operation of the vehicle. For example, the engine may communicate with the transmission, coordinating speed and gear shifting. These communications may occur over vehicle data bus 601. Vehicle data bus 601 may be the central network of vehicle 100, wherein vehicle modules and devices may be plugged into vehicle data bus 601 to communicate with other modules on the vehicle data bus 601. Each module or device on vehicle data bus 601 may control specific components relating to various vehicle functions and may communicate with the other modules as necessary using a standard protocol. Vehicle data bus 601 may be any number of common data buses, including, but not limited to a local interconnect network (LIN), a controller area network (CAN), a FlexRay bus, a media-oriented bus, a Keyword Protocol bus, a vehicle area network (VAN), a DC-BUS, an IDB-1394 bus, a SMARTwireX bus. According to various exemplary embodiments, vehicle data bus 601 may be a vehicle data bus of any past, present or future design or technology (standard or proprietary) capable of facilitating interconnected vehicle device-to-vehicle device communications.

Referring further to FIG. 6, according to an exemplary embodiment, signal transmitter (or transceiver) 603 is coupled to vehicle data bus 601 and is in communication with a variety of external devices 609. External devices 609 may be home-based external devices 609 that may be wirelessly controlled via the signal transmitter 603. For example, external devices 609 may be radio frequency-controlled home lighting devices, garage door openers, security systems, etc. Additionally, home control system 607 may provide similar functionality via other wireless technology or methods. For example, signal transmitter 603 may be a relatively low-powered signal transmitter while home control system 607 provides a higher power signal, WiFi signal, cellular signal, etc. Signal transmitter 603 may be a transmitter that can be programmed to duplicate transmission codes of original transmitters. According to an exemplary embodiment, home control system 607 may include a series of auxiliary buttons the driver of vehicle 100 may press to activate a number of home control functions. According to an exemplary embodiment, the auxiliary buttons of home control system 607 may activate or otherwise effect signal transmission from signal transmitter 603 to external devices 609.

Referring yet further to FIG. 6, control system 106 may include and/or be coupled to location module 610. Location module 610 may be any hardware, software and/or hardware and software combination configured to communicate location information to control system 106. Control system 106 may directly couple to location module 610 or be communicably coupled to location module 610 via the vehicle data bus 601. Location module 610 may be a Global Position System (GPS) module, or a module configured to obtain or calculate location information by other methods. For example, location module 610 may first determine that home control system and/or signal transmitter/transceiver 603 are within range of device 609 to make a second determination that the user is at home, work, or otherwise. Using this second determination, control system 106 may initiate and/or execute synchronization between a vehicle memory device and a memory device of a remote source. The synchronization may be configured specifically for the determined location. In this manner, the vehicle control system may intelligently synchronize with different remote sources based on a determination of location (e.g., a "home" location determination may trigger the synchronization of media files while a "work" location determination may trigger the synchronization of work-related files (contact information, calendar information, etc.)). Location information may comprise coordinates (e.g., latitude/longitude), a signal representing a location determination (e.g., a signal representing "home"), or any other metric, data, or signal pertaining to location. According to an exemplary embodiment, control system 106 is configured to receive the location information from the location module 610 after location is determined. In response to receiving the location information, control system 106 may be configured initiate a synchronization process with remote source 116. According to yet other exemplary embodiments, remote source 116 may include a location module (e.g., GPS receiver) and transfer location information to control system 106 via communication link 118. According to yet other exemplary embodiments, remote source 116 is configured to receive location information from another device (e.g., a wireless service organization, a separate GPS device, a remote server, a remote source, a connected mobile phone, a GPS-capable PDA, etc.) and to transfer the location information to control system 106 via communication link 118. Similarly, communication device 120 may be configured to receive location information wirelessly (e.g., from a WiFi hotspot, a nearby Bluetooth-compatible device, a GPS device, a mobile phone, a PDA, etc.). Further, data processing system 122 may be configured to make a location determination based on data received from vehicle data bus 601 and/or communication device 120. For example, when communication device 120 is able to detect the user's "home" wireless network (e.g., and the signal is sufficiently strong for a period of time), data processing system 122 may be configured to determine that the user is parked at home, and initiates synchronization based on this determination. By way of further example, when home control system 610 and/or transmitter/transceiver 603 is interacting with devices known by data processing system 122 to be "home" devices, processing system 122 may be configured to determine that the user is at home and to initiate a synchronization process. Yet further, processing system 122 might be configured to "try" to connect communication device 120 with devices known to be "home devices." If the connection is established (and/or the connection is stable for a period of time), the system will make a location determination and/or initiate the synchronization activity.

Figure 7:
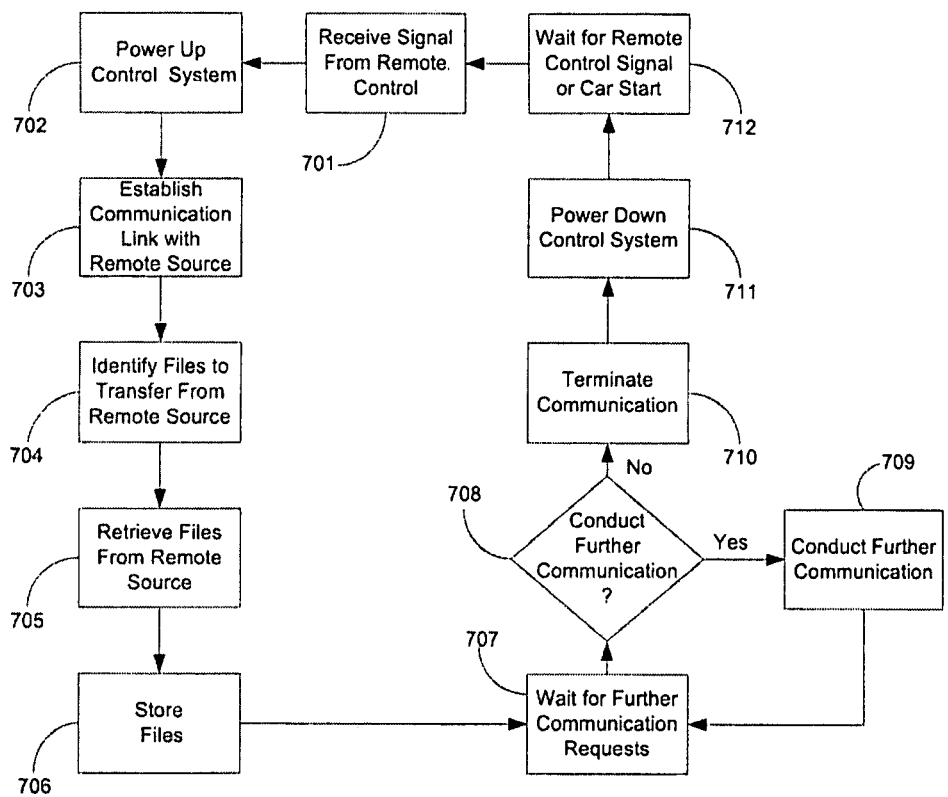
FIG. 7 is a flow chart of the synchronization process between the in-vehicle control system and a remote source, as activated by a source external the vehicle, according to an exemplary embodiment.

Referring to FIG. 7, according to an exemplary embodiment, a flow chart is provided for a process of synchronizing data files between control system 106 and remote source 116. The process illustrated in FIG. 7 may begin at step 701 wherein the vehicle may receive a synchronization signal (step 701) from the portable wireless device (remote control) 501. As mentioned previously, the synchronization process may also be initiated by any number of voice commands, user interface commands, location determinations, button presses (e.g., a press of "Sync" button 111 shown in FIG. 2) or other processes that may be completed by control system 106 or otherwise.

Upon receiving the synchronization signal from the remote control 701, the control system 106 may then power-up, wake, or otherwise initiate (step 702). Once the necessary components of control system 106 are powered and active, the system may then establish a communications link with a remote source (step 703). While a variety of communications may then be accomplished, according to an exemplary embodiment the system will then identify files to transfer (step 704) from remote source 154 to a vehicle memory device (e.g., memory device 132 shown in previous FIGS.). The step of identifying files to transfer (step 704) may include or be precluded by sending file information to the remote source. For example, control system 106 may be configured to generate a data file comprising information regarding the files already stored in the vehicle memory device. The generated file may include metadata or summaries of metadata relating to the files stored in the vehicle memory device. The generated file may be plain text, XML formatted, or otherwise. The remote source may be configured to parse or otherwise read the file to determine a transfer set. According to another exemplary embodiment, at step 704 control system 106 may be configured to receive file information relating to the files stored on the remote source. Using this received file information, control system 106 may create a transfer set, synchronization set, or otherwise. The transfer set may be created based on a comparison of a file or files stored on the vehicle memory device with a file or files stored the storage device of the remote source. According to yet other exemplary embodiments, control system 106 both generates and transmits file information relating to files stored locally and receives and uses file information relating to files stored remotely.

Once a transfer set of media files have been identified (step 704), the system may then begin retrieving media files (step 705) from the remote source 116 via wireless data communications. This step may also (or alternatively) include transmitting files from the in-vehicle control system to the remote source. As files are retrieved (and/or transmitted), or shortly thereafter, the system may store these files (step 706) in local memory device 132 or in any other device capable of file storage. For example, upon receipt of the files, in vehicle control system 106 may cause the files to be stored in another remote source coupled to the vehicle control system via a wired (e.g., USB) or wireless (e.g., WiFi, Bluetooth, etc.) connection.

After file storage has been initiated or completed (step 706), the system may wait for further communications requests (step 707). For example, remote source 116 may send a delete, copy, or any other file management command, to control system 106. Similar commands may be sent from control system 106 to the remote source. When some number of communication requests have been handled, some time has elapsed, or some other event has happened, the system may prompt the user (either at the car display, the remote source display, audibly via the audio system, or otherwise) whether further communication should be conducted (step 708). The system will conduct further communication (step 709) if the user so chooses. These steps 707, 708, 709 may create a loop whereby the user may continue communicating between the vehicle 100 and remote source 116 after the standard synchronization routine has completed. For example, the user may browse the files stored on control system 106 via the network connection and his personal computer display 505. Similarly, the user may browse the files stored on remote source 116 via the wireless communication link and/or the various I/O systems of the vehicle (e.g., display, audio system, etc.). When used in this manner, the user and the remote source 116 may recognize the control system 106 as a networked drive or networked computer on a LAN. The user may then conduct any and/or all file management tasks with the control system 106 via his home computer. If the user decides (at step 708) not to conduct further communication, the system may then terminate communication (step 710). After communication has been terminated (step 710), the system may then send itself into a sleep, hibernating, or powered-down state (step 711). Control system 106, vehicle data bus 601, and signal receiver 602 may wait for the remote control signal, car start, voice activation signal, button press signal, or otherwise (step 712) before powering up and/or starting any further communication tasks.

Figure 8:
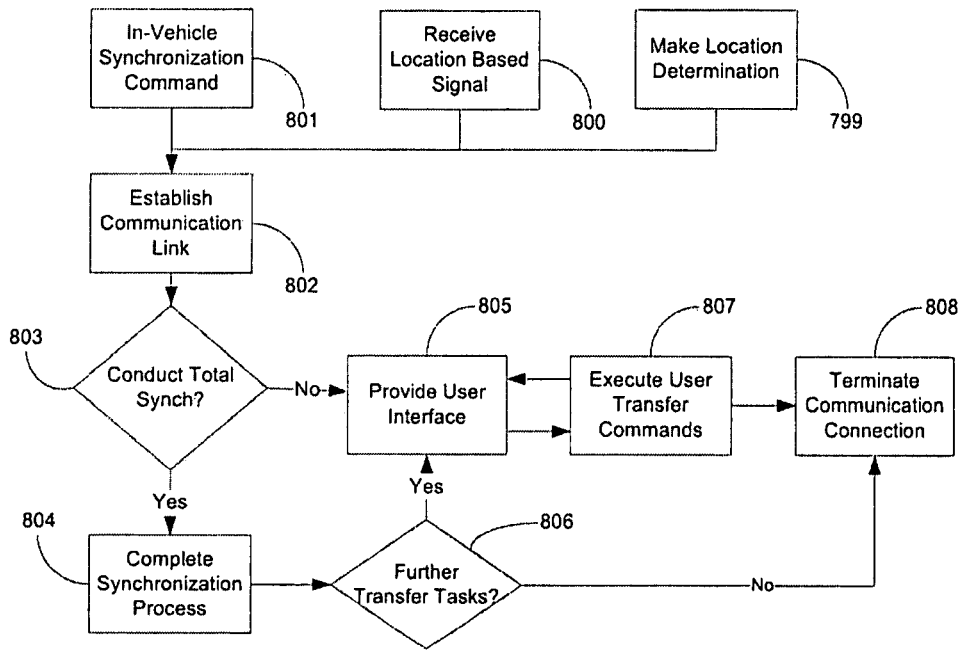
FIG. 8 is a flow chart of the synchronization process between the in-vehicle control system and a remote source, as activated by a source internal the vehicle, according to an exemplary embodiment.

Referring to FIG. 8, according to an exemplary embodiment, a flow chart illustrates a process of synchronizing data files between control system 106 and remote source 116 from within vehicle 100. FIG. 8 illustrates a flow diagram of an in-vehicle activated synchronization, according to an exemplary embodiment. At any time while located within vehicle 100, a user may take an action to provide an in-vehicle synchronization command (step 801) to control system 106. For example, the in-vehicle synchronization command (step 801) may be sent from audio input device 128, data processing system 122 (e.g., via speech recognition device 136, etc.), push buttons 110, 111, 112, 114, any additional buttons, output display 108 (e.g., touch screen enabled, etc.), home control system 607, etc. The user may use a voice command or commands to activate the initialization process. The voice command may be received by an audio input device, a signal representing the voice command may be sent from the audio input device to an interface of the control system, the control system may use a speech recognition device to recognize the voice command from the received signal, and the speech recognition device may provide the recognized command to the processing system. FIG. 8 also shows the steps of receiving a location-based signal (step 800) and making a location determination (step 799). Either step may be used alone to activate the synchronization process or may be used in combination with other user input steps. The control system may be configured to both receive a location-based signal (step 800) and to make a location determination (step 799). For example, the control system may receive GPS coordinates from a location module (or other device) and make a location determination based on the GPS coordinates.

Once an in-vehicle synchronization command has been received (step 801), the control system 106 may establish a communication link (step 802) with remote source 116. The control system 106 may then prompt the user (via output display 108, audio output devices 130, audio system 104, output display 108, etc.) whether the user would like to conduct a total synchronization (step 803). If the user selects "yes," (via button press, screen touch, voice command, or otherwise) the system may conduct a complete synchronization process (step 804) perhaps involving a comparison or identification of appropriate synchronization files and transferring the files. On the other hand, if the user selects "no," the system may provide a detailed user interface to the user (e.g., on output display 108) prompting the user for input regarding specific user transfer commands. Because step 803 allows a user to choose between total synchronization and user driven synchronization, the system may allow the user to decide what level of interaction they would like to have with the system. For example, while driving or conducting other vehicle tasks, it may be desirable to have the synchronization conducted automatically or relatively "behind-the-scenes." On the other hand, if the user has just pulled into the driveway, for example, and would like a large amount of control over synchronization and other file transfer tasks, he or she may choose to have a detailed graphical user interface provided to him or her on output display 108. With the detailed graphical user interface, the user may execute any number of user transfer commands (step 807), again, possibly viewing any device (and/or a directory or folder structure thereof) on a connected wireless network to effect transfer. Moreover, the user may conduct other tasks, such as browsing the Internet to download files, while a communication link with remote source 116 is active. Once all communication tasks have been completed the user may elect to terminate the communication connection (step 808).

Figure 9:
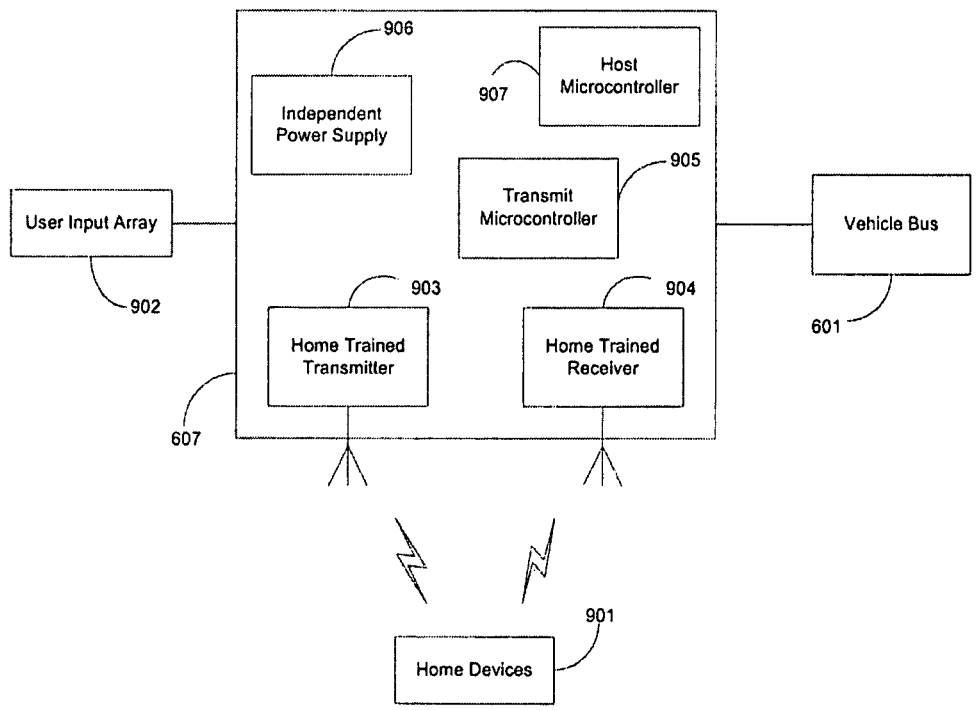
FIG. 9 is a block diagram of a home control device for use with the in-vehicle control system of the previous FIGS., according to an exemplary embodiment.

Referring to FIG. 9, according to an exemplary embodiment, a home control system 607 is illustrated that may be connected to vehicle bus 601. Home control system 607 may be an integrated transceiver that can be programmed to communicate with home devices 901. According to an exemplary embodiment, home devices 901 may include radio frequency devices such as garage doors, gates, entry door locks, home/office lighting, or other RF devices. Through a training processing, the home control system 607 may be configured to duplicate RF codes of original transmitters, allowing home control system 607 to be used with most existing RF systems. Home control system 607 may be located in the visor of vehicle 100, in the overhead system, on the ceiling, integral with control system 106 housing, or may exist at any other location on vehicle 100. Home control system 607 may generally include a user input array 902, a home trained transmitter 903, a home trained receiver 904, a transmit microcontroller 905, an independent power supply 906, and a host microcontroller 907. According to an exemplary embodiment, home control device 607 is a radio frequency enabled device operating within a frequency range of 250-450 Mhz. According to various alternative embodiments, home control device 607 is a radio frequency enabled device capable of operating on any radio frequency or radio frequencies capable of providing communications. Home control system 607 may be the HomeLink® system sold by Johnson Controls, Inc. According to various embodiments, home control device 607 is configured to transmit on frequencies between 27-50 Mhz.

Referring to FIG. 9, according to an exemplary embodiment, home control device 607 may generally operate via user input array 902. User input array 902 may be an array of small programmable tactile buttons. Each button of the array 902 may be capable of being associated with one or more radio frequency device codes such that when a user presses any specific button the corresponding code is transmitted from the home trained transmitter 903. According to an exemplary embodiment, when an input device of input array 902 is pressed or otherwise activated, the home control device 607 not only transmits to home device 901, but also sends a signal via vehicle data bus 601 to control system 106 to begin synchronization with a remote source 116.

Home control device 607 may include a transmit microcontroller 905, an independent power supply 906, and a host microcontroller 907. Using these parts, home control device 607 may operate independently from control system 106 during normal (i.e., non-synchronizing, etc.) operation. Home control device 607 may include only a single transmit microcontroller 905 wherein the power supply 906 may be hardwired to the channel buttons (i.e., of user input array), such that when a button was pressed power would be provided to the transmit microcontroller 905 and subsequently the home trained transmitter. When configured in this manner, home control device 607 might only be able to transmit when the user is pressing the button. This can result in a situation where the user either did not press the button long enough (as some circuit delay was present) or the user was forced to hold the button for an inconvenient amount of time (i.e., until the receiving home control device was in range and received the signal, etc.). According to the exemplary embodiment illustrated in FIG. 9, a host microcontroller 907 is also provided. Host microcontroller 907 may have either of the two functions described below, at least the two functions described below, or otherwise. First, host microcontroller 907 may be configured to improve user convenience by not requiring the user to hold down a button of user input array 902 until the receiver activates. Host microcontroller 907 may accomplish this by receiving feedback from the transmit microcontroller 905 that the button being pressed corresponds to a particular trained channel. Then, even if the user releases the button, host microcontroller 907 could act as if the button was still being pressed such that the home control device 607 may continue transmitting some period of time (e.g., 1-5 seconds, greater than 5 seconds, etc.) after physical release of the button. According to another exemplary embodiment, home control device 607 transmits for a first period of time longer than the button press, stops transmitting for some period of time, then transmits for a second period of time. Therefore, even if the user initially pressed the button while out of range and the first transmit did not reach home device 901, the second transmit might successfully reach the home device. For example, instead of holding a button for a long period of time (e.g., up to 5 seconds, greater than 5 seconds, etc.) a user may only have to give the button a one-half second tap. Users may sense greater range and functionality from home control device 607 as they approach home. For example, a user may press a button while just out of range. Because home control device 607 continues transmitting after a button press, when home device is activated as vehicle 100 approaches, the user may perceive his initial button press as being in range. Additionally, the user may not have to separately begin a synchronization process.

A second function the host microcontroller 907 may provide is to add non-home control related functions such as a compass to vehicle 100. For example, host microcontroller may receive a compass signal, process a compass signal, translate the compass signal to a direction, and/or translate the direction to a signal for forwarding to a compass display, the control system, or otherwise. Host microcontroller 907 (and/or another component of home control device 607) may also (or alternatively) be configured to send a synchronization signal to the control system when the user input array is used. Home control device 607 may thereby be configured to activate home device 901 and begin synchronization with remote source 116 without having to continue pressing a button or navigating through menus to begin synchronization. In other words, one button press (or voice command, screen touch, etc.) might be used to conduct a number of tasks. For example, a user may only need to press one button on user input array 902 to activate home devices 901 (e.g., open the garage door, turn on the lights, etc.) and ensure that the user's vehicle control system 106 is synchronized with remote source 116 (e.g., home personal computer, etc.). According to various alternative embodiments, home control device 607 may have any number of microcontrollers, hardware devices, power supplies, input mechanisms, connections, etc. According to various embodiments, the functionality or circuitry of home control device 607 may be implemented partially within software, may be implemented partially within control system 106, may be implemented entirely within control system 106, or within any combination of these possibilities. According to an exemplary embodiment, home control device 607 is any in-vehicle device of the past, present or future capable of triggering a receiver of a home control device 607 and/or activating a vehicle to home synchronization task.

Figure 10:
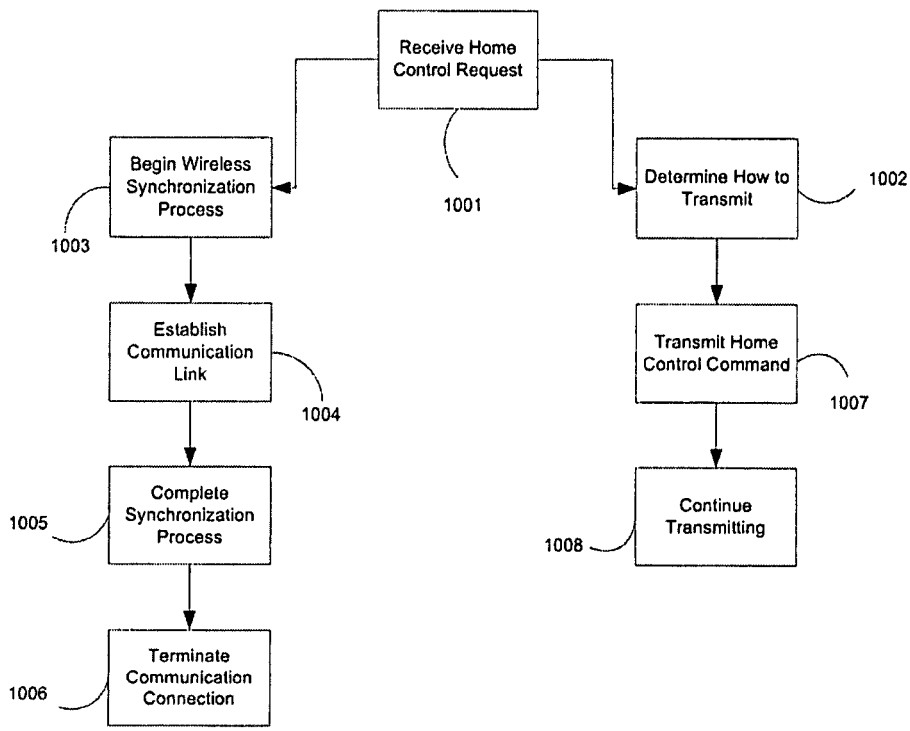
FIG. 10 is a flow chart of a synchronization process for use with the home control device of FIG. 9 or otherwise, according to an exemplary embodiment.

Referring to FIG. 10, according to an exemplary embodiment, a flow chart illustrates a process wherein home control device 607 may be used to begin a wireless synchronization process and activate a home device 901. Home control device 607 may receive a home control request (step 1001) from its own input array 902 or from an input mechanism of control system 106 (e.g., voice command). The home control device 607 may then simultaneously (or close-in-time) begin a home control transmission process (starting at step 1002) and begin a wireless synchronization process (step 1003).

Referring further to FIG. 10, according to an exemplary embodiment, the home control transmission process (starting at step 1002) may include determining how to transmit (step 1002), transmitting the home control command (step 1007), and continuing to transmit (step 1008). When home control device 607 is determining how to transmit (step 1002), it may associate the button of input array 902 pressed with a particular transmission task (e.g., a code, a scheme such as rolling code or fixed, a channel, a set of frequencies, etc. that are associated with the home device 901 the user intends to trigger). When home control device 607 is transmitting the home control command (step 1007) and continuing to transmit (step 1008), the home control device host microcontroller 907 may be coordinating a transmission that lasts after a user has released a button of user input array 902.

Referring further to FIG. 10, according to an exemplary embodiment, the received home control request (step 1001) may also activate a synchronization process (step 1003) between the control system 106 and a remote source 116. When the home control request is received, the home control device may be configured to send a signal to the control system, the signal may represent or be a command for the control system to begin the synchronization process. Control system 106 may continue the synchronization steps as detailed in previous FIGS. and description or otherwise. According to an exemplary embodiment, the steps of synchronization may be truncated when home control device 607 activates synchronization (step 1003). For example, after home control device 607 begins the synchronization process (step 1003), control system 106 may simply establish a communications link (step 1004), complete the synchronization process (step 1005), and terminate the communications link (step 1006) (with or without further user input). According to various exemplary embodiments, any process may be used with home control device 607 to complete a synchronization process and/or complete a home control process.

Figure 11:
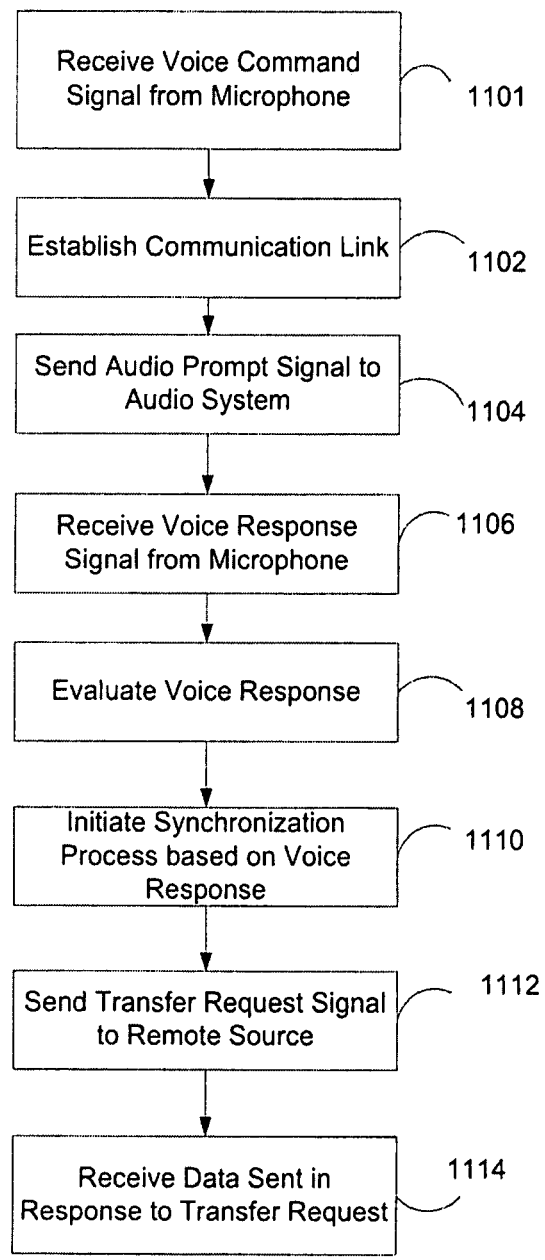
FIG. 11 is a flow chart of a synchronization process that may be controlled by voice and speech recognition.

Referring now to FIG. 11, a process for synchronizing a vehicle control system and a remote source is shown. At any time during the operation of the vehicle, the user may speak a voice command. The command could be, for example, "Synchronize with Media Player," "Sync with Cell Phone," "Sync Calendar with PDA," "Sync New Music on IPOD® with Vehicle," etc. The audio input device (e.g., microphone) will receive the voice command and a signal representing the voice command will be sent from the audio input device to the control system. The control system will receive the signal representing the voice command from the audio input device (step 1101). Upon receipt of the signal, the control system may parse the signal, recognize the phonemes, identify the command based on the recognized phonemes, and/or take any number of steps or sub-steps for recognizing the voice command from the signal received from the microphone. Based on the voice command, the control system is configured to establish a wireless communication link with the remote source (step 1102). To receive further vocal instruction from the user, the control system may send an audio prompt signal to the vehicle audio system via an interface (step 1104). The audio prompt may include, for example, a question relating to which files to synchronize, the date of the files to synchronize, whether the synchronization should overwrite any files, etc. The control system may be configured to receive voice commands (or commands from other user interface elements) relating to the category of the files to synchronize (e.g., work, home, calendar, media, music, video, maps, navigation, configuration files, etc.), the type of file to synchronize (word processing document, spreadsheet documents, mp3 files, zip files), the size of the files to synchronize (e.g., less than one megabyte, more than one megabyte, etc.), the date created, the date last modified, the genre, the artist, the album, the user-assigned rating of the file, the creator, the owner of the file, etc. The control system may further be configured to process the received commands and to build synchronization sets (transfer sets) based on the received and processed commands. The system may receive the further vocal instruction from the user via the microphone (step 1106). The voice response may be recognized and evaluated by the control system (step 1108). Based on the voice response, the system may then initialize synchronization (step 1110). Synchronize initialization may include tagging or queuing certain files for transfer. Once the system is initialized, the system may send a transfer request signal to the remote source (step 1112). When data is received by the control system in response to the transfer request (step 1114), the system may store the data, forward the data, play back the data, display the data, or otherwise.

According to any preferred embodiment, control system 106 is an in-vehicle control system 106 as generally illustrated by the FIGS. Control system 106 may include memory device 132 having at least a non-volatile memory 142. Control system 106 may also include communications device 120 configured to communicate with a variety of different devices. Communications device 120 may be a wireless communications device configured to communicate with a variety of wireless devices (e.g., mobile phone 144, personal digital assistant 146, media player 148, personal navigation device 150, pager 152, remote source 116, remote server 154, etc.). Control system 106 may be configured to conduct various file synchronization tasks with any of the aforementioned devices. Synchronization may be activated via a portable wireless device 501 such as a key fob or via an activating mechanism within vehicle 100. Control system 106 may exist communicably connected to the vehicle's primary vehicle data bus 601. A signal receiver 602 configured to receive signals from portable wireless device 501 may also be coupled to vehicle data bus 601 and/or control system 106. A user may press a synchronization button 504 on the portable wireless device 501 to activate synchronization between control system 106 and remote source 116. If the control system 106 is in a powered-down state, the vehicle data bus 601 may activate or power-up components of control system 106 to begin synchronization. The control system 106 may provide the user options relating to the synchronization, or may establish a communications link and conduct synchronization tasks without further user interaction. Synchronization may include comparing files within control system 106 and remote source 116, building a difference set or transfer set between the files, and sending and receiving files until specified file stores are the same on control system 106 and remote source 116. When synchronization has completed, the control system 106 may terminate the communication link and return to a powered-down state.

While the exemplary embodiments illustrated in the Figures and described above are presently preferred, it should be understood that these embodiments are offered by way of example only. Accordingly, the present invention is not limited to a particular embodiment, but extends to various modifications that nevertheless fall within the scope of the appended claims. The order or sequence of any processes or method steps may be varied or re-sequenced according to alternative embodiments.

Describing the invention with Figures should not be construed as imposing on the invention any limitations that may be present in the Figures. The present invention contemplates methods, systems and program products on any machine-readable media for accomplishing its operations. The embodiments of the present invention may be implemented using an existing computer processors, or by a special purpose computer processor for an appropriate vehicle system, incorporated for this or another purpose or by a hardwired system. Further, although some Figures may be described as alternative or separate embodiments, it should be understood that various processes, components, and systems could co-exist in one embodiment. For example, the control system 106 might be configured to execute some of the processes shown and/or described, one of the processes, all of the processes, or otherwise.

It is important to note that the construction and arrangement of the control system as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements (e.g., control system 106, memory device 132, communications device 120, data processing system 122, remote source 116, remote server 154, home control device 607, etc.), the position of elements may be reversed or otherwise varied (e.g., the components of control system 106, home control device 607, etc.), and the nature or number of discrete elements or positions may be altered or varied (e.g., communications device 120, memory device 132, the components of control system 106, etc.). Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present inventions as expressed in the appended claims.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software implementations of the present invention could be accomplished with standard programming techniques with rule based logic and other logic to accomplish the various connection steps, processing steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. An in-vehicle control system for synchronizing files with a remote source, the remote source having a storage device configured to store a first file and a second file, the system comprising:
   a communications device capable of establishing a wireless communication link with the remote source, wherein the communications device is configured to send, receive, or both send and receive files to and/or from the remote source;
   a memory device configured to store the second file;
   a data processing device coupled to the communications device, the data processing device configured to receive the first file of the remote source during a data synchronization process, wherein the first file of the remote source includes information relating to one or more files stored on the remote source, wherein the data processing device is further configured to receive and store the second file of the remote source based on the first file;
   a home control device; and
   an input device coupled to the home control device and configured to output a first control signal to the home control device in response to a single input,
   wherein the home control device, in response to receiving the first control signal, is configured to:
      transmit a home control command to activate a home device, and
      transmit a second control signal to the communications device,
   wherein the communications device is configured to establish a wireless communication link with the remote source to initiate the data synchronization process in response to receiving the second control signal from the home control device,
   wherein the home control device is configured to transmit the second control signal when the home control device is requested to transmit the home control command such that the transmission of the home control command to activate the home device and the initiation of the data synchronization process occur substantially simultaneously in response to operation of the input device.

2. The in-vehicle control system of claim 1, wherein the in-vehicle control system is connected to a vehicle data bus.

3. The in-vehicle control system of claim 2, wherein the vehicle data bus is communicably connected to at least a second wireless communications device located within the vehicle.

4. The in-vehicle control system of claim 3, wherein the second wireless communications device is configured to receive wireless signals from a portable wireless device.

5. The in-vehicle control system of claim 4, wherein the second wireless communication device is further configured to receive commands from the portable wireless device and to provide the commands to the data processing system via the vehicle data bus.

6. The in-vehicle control system of claim 4, wherein the portable wireless device is configured to send a data synchronization command to the data processing system via the second wireless communication device to initiate the data synchronization process.

7. The in-vehicle control system of claim 6, wherein the portable wireless device is further configured to trigger at least one vehicle hardware function.

8. The in-vehicle control system of claim 7, wherein the portable wireless device is a key fob.

9. The in-vehicle control system of claim 7, wherein the at least one vehicle hardware function includes a vehicle cabin door unlock function.

10. The in-vehicle control system of claim 1, wherein the home control device is configured to continue to transmit the home control command to activate the home device after a user input has been completed.

11. The in-vehicle control system of claim 10, wherein the home control device includes a first microcontroller and a second microcontroller, wherein the first microcontroller matches user input to a trained signal, and wherein the second microcontroller coordinates the home control command transmission that may continue after the user input has been completed.

\* \* \* \* \*